United States Patent
Berlin

(10) Patent No.: US 9,633,089 B1
(45) Date of Patent: *Apr. 25, 2017

(54) AGGREGATED SEARCH

(71) Applicant: hopTo Inc., Campbell, CA (US)

(72) Inventor: Christoph Berlin, Milpitas, CA (US)

(73) Assignee: HOPTO INC., Campbell, CA (US)

( * ) Notice: Subject to any disclaimer, the term of this patent is extended or adjusted under 35 U.S.C. 154(b) by 104 days.

This patent is subject to a terminal disclaimer.

(21) Appl. No.: 13/831,806

(22) Filed: Mar. 15, 2013

Related U.S. Application Data

(62) Division of application No. 13/831,802, filed on Mar. 15, 2013, now Pat. No. 9,547,694.

(51) Int. Cl.
*G06F 17/30* (2006.01)
*G06F 9/50* (2006.01)

(52) U.S. Cl.
CPC .. *G06F 17/30554* (2013.01); *G06F 17/30519* (2013.01); *G06F 9/5027* (2013.01); *G06F 17/30991* (2013.01)

(58) Field of Classification Search
CPC ......... G06F 17/30991; G06F 17/30017; G06F 9/5027; G06F 3/0481
USPC ................................ 707/722, 723, 755, 770
See application file for complete search history.

(56) References Cited

U.S. PATENT DOCUMENTS

| | | | |
|---|---|---|---|
| 6,763,501 B1 | 7/2004 | Zhu et al. | |
| 7,043,534 B1* | 5/2006 | Donnelly et al. | 709/217 |
| 7,062,781 B2* | 6/2006 | Shambroom | 726/10 |
| 7,359,951 B2 | 4/2008 | Goel et al. | |
| 7,386,615 B1 | 6/2008 | Surlaker et al. | |
| 7,447,761 B1* | 11/2008 | Ferguson et al. | 709/224 |
| 7,523,103 B2 | 4/2009 | Goel et al. | |
| 7,548,979 B2* | 6/2009 | Hanners et al. | 709/227 |
| 7,984,061 B1 | 7/2011 | Goel et al. | |
| 8,219,720 B2* | 7/2012 | Saint-Hilaire et al. | 710/11 |
| 8,280,993 B2* | 10/2012 | Awadallah et al. | 709/223 |
| 8,438,216 B2* | 5/2013 | Runcie et al. | 709/203 |
| 8,489,880 B1* | 7/2013 | Gagnon et al. | 713/176 |
| 8,555,187 B2 | 10/2013 | Margolin | |
| 9,092,525 B2 | 7/2015 | Nandakumar et al. | |
| 9,286,294 B2 | 3/2016 | Asmussen et al. | |
| 2001/0034841 A1* | 10/2001 | Shambroom | 713/201 |
| 2002/0042923 A1* | 4/2002 | Asmussen | G06F 17/30017 725/92 |

(Continued)

OTHER PUBLICATIONS

U.S. Appl. No. 13/831,789, Christoph Berlin, Aggregated Remote Viewing, filed Mar. 15, 2013.

(Continued)

*Primary Examiner* — Jean M Corrielus
(74) *Attorney, Agent, or Firm* — Polsinelli LLP

(57) ABSTRACT

Systems and methods for aggregated search are provided. A user using a client device may provide a search request concerning a file hosted at a remote host. It is determined that the client device has an open session with each of a plurality of remote hosts. Search commands are generated and sent to the remote hosts. Such search commands may be based on an application programming interface specific to the particular remote hosts. Search results may be received from the remotes hosts. The search results may then displayed on the client device in a consolidated list, which may be sorted according to any parameter selected by the user and/or known in the art.

19 Claims, 3 Drawing Sheets

(56) References Cited

U.S. PATENT DOCUMENTS

| | | |
|---|---|---|
| 2002/0103797 A1* | 8/2002 | Goel et al. .................... 707/5 |
| 2003/0101294 A1* | 5/2003 | Saint-Hilaire et al. ......... 710/11 |
| 2005/0005015 A1* | 1/2005 | Hanners ............... G06F 9/5027 709/227 |
| 2005/0165742 A1 | 7/2005 | Chin |
| 2006/0161859 A1 | 7/2006 | Holecek et al. |
| 2006/0282514 A1* | 12/2006 | Saint-Hilaire et al. ....... 709/218 |
| 2007/0156689 A1 | 7/2007 | Meek et al. |
| 2008/0016255 A1* | 1/2008 | Saint-Hilaire et al. ......... 710/11 |
| 2009/0063448 A1* | 3/2009 | DePue et al. ..................... 707/5 |
| 2009/0177791 A1* | 7/2009 | Edelstein .............. H04L 67/025 709/229 |
| 2009/0234823 A1* | 9/2009 | Wong .............................. 707/4 |
| 2009/0254664 A1 | 10/2009 | Wada |
| 2009/0319695 A1* | 12/2009 | Saint-Hilaire et al. ......... 710/11 |
| 2010/0026608 A1 | 2/2010 | Adams et al. |
| 2010/0082733 A1 | 4/2010 | Bernstein et al. |
| 2010/0257450 A1 | 10/2010 | Go et al. |
| 2010/0299187 A1* | 11/2010 | Duggal ................. G06Q 10/10 705/14.1 |
| 2010/0325245 A1 | 12/2010 | Sibillo |
| 2011/0131523 A1 | 6/2011 | Grant et al. |
| 2011/0138295 A1 | 6/2011 | Momchilov et al. |
| 2011/0150432 A1* | 6/2011 | Paul .................... H04L 65/4084 386/297 |
| 2011/0209064 A1 | 8/2011 | Jorgensen et al. |
| 2011/0231518 A1 | 9/2011 | Srinivasan et al. |
| 2011/0276720 A1* | 11/2011 | Ickman et al. ................ 709/245 |
| 2012/0084713 A1 | 4/2012 | Desai et al. |
| 2012/0173612 A1 | 7/2012 | Vegesna-Venkata et al. |
| 2012/0290567 A1* | 11/2012 | Nandakumar et al. ....... 707/723 |
| 2012/0290614 A1* | 11/2012 | Nandakumar et al. ....... 707/770 |
| 2012/0304119 A1 | 11/2012 | Hoogerwerf et al. |
| 2013/0018939 A1 | 1/2013 | Chawla et al. |
| 2013/0104044 A1 | 4/2013 | Gujarathi et al. |
| 2013/0111033 A1 | 5/2013 | Mao et al. |
| 2013/0117678 A1 | 5/2013 | Sun et al. |
| 2013/0138810 A1 | 5/2013 | Binyamin et al. |
| 2013/0166629 A1* | 6/2013 | Ivashin ................... H04L 63/10 709/203 |
| 2013/0167201 A1* | 6/2013 | Patel ................... H04L 67/1097 726/4 |
| 2013/0282752 A1 | 10/2013 | Day-Richter et al. |
| 2013/0282755 A1 | 10/2013 | Procopio et al. |
| 2014/0032489 A1 | 1/2014 | Hebbar et al. |
| 2014/0059158 A1 | 2/2014 | Chen et al. |
| 2014/0067835 A1* | 3/2014 | Harrison et al. ............. 707/755 |
| 2014/0250170 A1 | 9/2014 | Duggal |
| 2015/0165742 A1* | 6/2015 | Reese, Jr. ............... B32B 7/045 156/64 |
| 2015/0188990 A1 | 7/2015 | Kacmarcik et al. |
| 2015/0205447 A1* | 7/2015 | Jia ....................... G06F 3/04847 715/790 |
| 2015/0205462 A1 | 7/2015 | Jitkoff et al. |
| 2015/0215371 A1 | 7/2015 | Zamir |

OTHER PUBLICATIONS

U.S. Appl. No. 13/831,793, Christoph Berlin, Aggregated Remote Viewing, filed Mar. 15, 2013.
U.S. Appl. No. 13/831,795, Christoph Berlin, Cloud-based Aggregated Remote Viewing, filed Mar. 15, 2013.
U.S. Appl. No. 13/831,798, Christoph Berlin, Remote Viewing Using Multiple Hosts, filed Mar. 15, 2013.
U.S. Appl. No. 13/831,799, Christoph Berlin, Remote Viewing Using Multiple Hosts, filed Mar. 15, 2013.
U.S. Appl. No. 13/831,800, Christoph Berlin, Cloud-based Remote Viewing Using Multiple Hosts, filed Mar. 15, 2013.
U.S. Appl. No. 13/831,802, Christoph Berlin, Aggregated Search, filed Mar. 15, 2013.
U.S. Appl. No. 13/831,807, Christoph Berlin, Cloud-Based Aggregated Search, filed Mar. 15, 2013.
U.S. Appl. No. 13/831,789 Office Action mailed Feb. 10, 2015.
U.S. Appl. No. 13/831,799 Office Action mailed Feb. 27, 2015.
U.S. Appl. No. 13/831,795 Office Action mailed Dec. 4, 2014.
U.S. Appl. No. 13/831,800 Office Action mailed Dec. 1, 2014.
U.S. Appl. No. 13/831,802 Office Action mailed Oct. 23, 2014.
U.S. Appl. No. 13/831,807 Office Action mailed Oct. 21, 2014.
U.S. Appl. No. 13/831,789 Final Office Action mailed Jun. 26, 2015.
U.S. Appl. No. 13/831,795 Final Office Action mailed Jun. 5, 2015.
U.S. Appl. No. 13/831,800 Final Office Action mailed Jun. 5, 2015.
U.S. Appl. No. 13/831,793 Office Action mailed Mar. 13, 2015.
U.S. Appl. No. 13/831,802 Final Office Action mailed Apr. 30, 2015.
U.S. Appl. No. 13/831,807 Final Office Action mailed Apr. 30, 2015.
U.S. Appl. No. 13/831,799 Final Office Action mailed Sep. 28, 2015.
U.S. Appl. No. 13/831,802 Office Action mailed Nov. 24, 2015.
U.S. Appl. No. 13/831,798 Final Office Action mailed Jan. 25, 2016.
U.S. Appl. No. 13/831,807 Office Action mailed Jan. 11, 2016.
U.S. Appl. No. 13/831,807 Final Office Action mailed Jun. 16, 2016.

* cited by examiner

AGGREGATED SEARCH

CROSS-REFERENCE TO RELATED APPLICATIONS

The present invention is related to U.S. Pat. No. 5,831,609 filed Jun. 6, 1995 and U.S. patent application Ser. No. 13/481,743 filed May 25, 2002, the disclosures of which is incorporated herein by reference.

BACKGROUND

Field of the Invention

The present invention generally relates to remote viewing. More specifically, the present invention relates to aggregated search.

Description of the Related Art

Individuals currently have a variety of options for communicating and carrying out transactions. Such options may include traditional desktop computing devices, as well as various mobile devices (e.g., mobile phones, smartphones, tablets). In fact, many individuals may use multiple computing and mobile devices at home, work, and on the move. For example, an individual may use a desktop computer at work, a laptop computer at home, and one or more mobile devices (e.g., smartphone, tablet) elsewhere. As such, people have come to expect to be able to have access to data and computing resources so to perform most computing tasks anywhere.

One difficulty in meeting such an expectation is that the various computing devices may not all have the same capabilities. For example, such devices may run different operating systems/platforms and applications. Such differences may make it difficult to support the same tasks across such devices. One solution has been to provide remote desktops where a first device runs the applications and a second device receives the visual display that appears on the first device over a communication network (e.g., Internet). Such remote desktops can allow users to access and control resources and data on the first device at a remote location using a second (e.g., portable) device.

One drawback to such an approach arises from the fact that such devices are generally used differently, so applications may be optimized for one type of device, but not another. For example, the different devices may have different sizes and input options (e.g., keyboard, keypad, touchscreen). The display of one device may not be optimized for a second device. For example, if a desktop computer display is shrunk to fit on a smartphone screen, the shrunken size may be difficult for the user to read or discern what is being displayed. Alternatively, if the display is not shrunken, the smartphone may only be able to display a portion of the original display at a time, which also adds to the difficulty in reading and discerning what is being displayed. While some devices allow for manual adjustment of the display by the user, changing displays and images may require the user to continually re-adjust the display, which may be unwieldy and inconvenient. Such is the case in many applications where content only uses a portion of the screen and user interface portions (e.g., toolbars, status bars, scroll bars, rulers).

Likewise, use of each particular device may vary based on its other specifications, including processing ability, memory, availability of applications, etc. For example, a desktop computer allows for multi-tasking involving the concurrent use of multiple applications, multiple documents, etc. The ability to multi-task on a mobile device may be more limited in comparison.

There is a need in the art for improved systems and methods for aggregated search.

SUMMARY OF THE CLAIMED INVENTION

Embodiments of the present invention include systems and methods for aggregated search. A user using a client device may provide a search request concerning a file hosted at a remote host. It is determined that the client device has an open session with each of a plurality of remote hosts. Search commands are generated and sent to the remote hosts. Such search commands may be based on an application programming interface specific to the particular remote hosts. Search results may be received from the remotes hosts. The search results may then displayed on the client device in a consolidated list, which may be sorted according to any parameter selected by the user and/or known in the art.

Various embodiments of the present invention include methods for aggregated search. Such methods may include receiving a search request on a client device for a remote file, and executing instructions by a processor to determine that the client device has an open session with each of a plurality of remote hosts and generate a plurality of search commands to the remote hosts. An exemplary search command may be based on an application programming interface specific to one of the remote hosts. Such search commands may be sent to the possible remote hosts, and search results may be received by the client device in return. The client device may generate a display of search results received by the client device from one or more of the remote hosts in response to the search commands.

Embodiments of the present invention may further include systems for aggregated search. Such systems may include one or more host devices and a client device requesting document information from a host device. Each host device may host a plurality of files that are available to the client device via individual sessions. The client device may receive a search request from a user, determine which host devices are currently available via session, generate a search command for each available host device, receive search results in response, and generate a display listing the search results.

Other embodiments of the present invention include non-transitory computer-readable storage media on which is embodied instructions executable to perform a method for aggregated search as previously set forth above.

DETAILED DESCRIPTION

Systems and methods for aggregated search are provided. A user using a client device may provide a search request concerning a file hosted at a remote host. It is determined that the client device has an open session with each of a plurality of remote hosts. Search commands are generated and sent to the remote hosts. Such search commands may be based on an application programming interface specific to the particular remote hosts. Search results may be received from the remotes hosts. The search results may then displayed on the client device in a consolidated list, which may be sorted according to any parameter selected by the user and/or known in the art.

Figure 1:
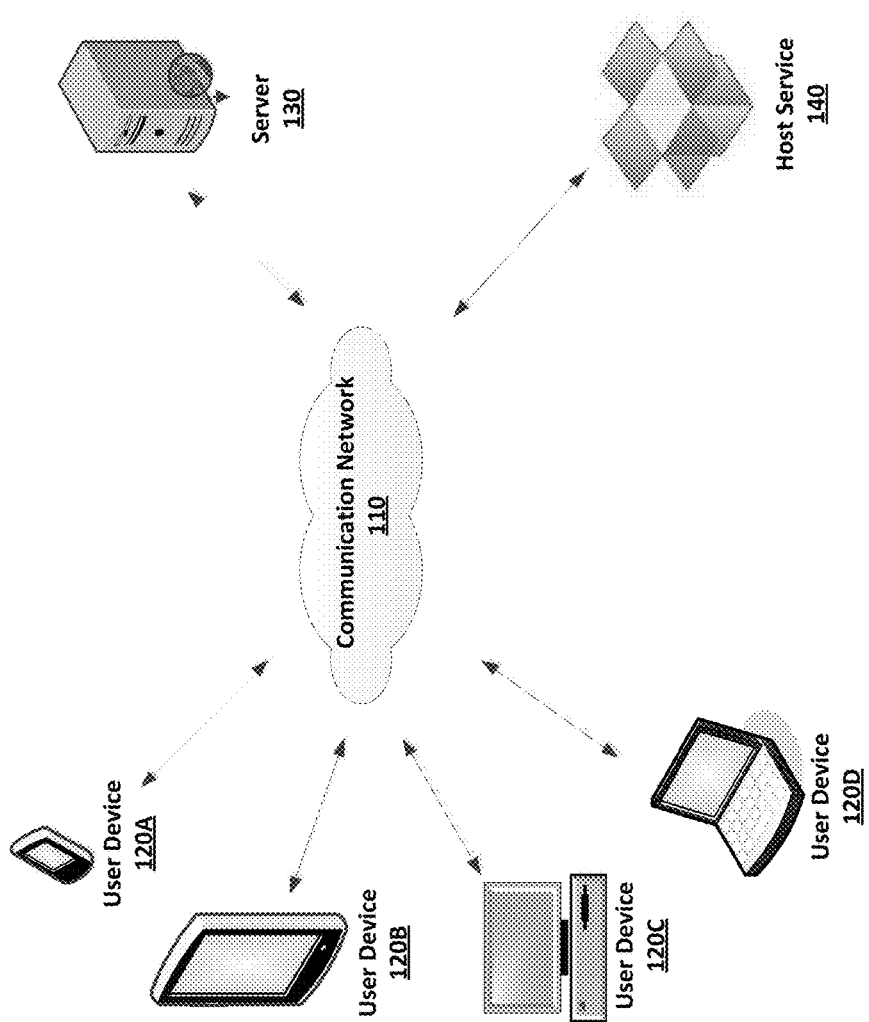
FIG. 1 illustrates a network environment in which an exemplary system for aggregated search may be implemented.

FIG. 1 illustrates a network environment 100 in which a system for aggregated search may be implemented. Network environment 100 may include a communication network 110, one or more user devices 120A-D, a server 130, and a host service 140. Devices and services in network environment 100 may communicate with each other via communications network 110.

Communication network 110 may be a local, proprietary network (e.g., an intranet) and/or may be a part of a larger wide-area network (e.g., the cloud). The communications network 110 may be a local area network (LAN), which may be communicatively coupled to a wide area network (WAN) such as the Internet. The Internet is a broad network of interconnected computers and servers allowing for the transmission and exchange of Internet Protocol (IP) data between users connected through a network service provider. Examples of network service providers are the public switched telephone network, a cable service provider, a provider of digital subscriber line (DSL) services, or a satellite service provider. Communications network 110 allows for communication between the various components of network environment 100.

Users may use any number of different electronic computing user devices 120A-D, which may include general purpose computers, mobile phones, smartphones, personal digital assistants (PDAs), portable computing devices (e.g., laptop, netbook, tablets), desktop computing devices, handheld computing device, or any other type of computing device capable of communicating over communication network 110. Such devices 120A-D may also be configured to access data from other storage media, such as memory cards or disk drives as may be appropriate in the case of downloaded services. Such devices 120A-D may include standard hardware computing components such as network and media interfaces, non-transitory computer-readable storage (memory), and processors for executing instructions that may be stored in memory.

User device 120A is illustrated as a mobile phone or smartphone, user device 120B is illustrated as a tablet computing device, user device 120C is illustrated as a desktop computing device, and user device 120D is illustrated as a laptop computing device. As can be seen, each device is sized differently and/or has different input options. Exemplary embodiments of the present invention allow for tasks and applications that are specific to one device (e.g., operating in a Microsoft Windows® environment) to be used and optimized for another user device (e.g., operating in an Apple iOS® environment).

Each user device 120 may act as a host device interacting with another user device 120 that acts as a client; likewise, each user device 120 may act as the client device in communication with another user device 120 acting as a host. A user device 120 may further include a client application, a client 3D library, and a client display driver. Collectively, these elements may enable the user device and the user to consume computer graphics resources or services provided by server 110.

Server 130 may include any type of server or other computing device as is known in the art, including standard hardware computing components such as network and media interfaces, non-transitory computer-readable storage (memory), and processors for executing instructions or accessing information that may be stored in memory. The functionalities of multiple servers may be integrated into a single server. Any of the aforementioned servers (or an integrated server) may take on certain client-side, cache, or proxy server characteristics. These characteristics may depend on the particular network placement of the server or certain configurations of the server.

Server 130 may associated with the same user and located in the same local network as user device 120. Alternatively, server 130 may be located remotely (e.g., in the cloud) and may be associated with a third party that provides services in accordance with embodiments of the present invention. In some instances, the services may be provided via software (e.g., software as a service) downloaded from server 130 to one or more user devices 120. Updated software may similarly be downloaded as the updates become available or as needed. In this regard, host service 140 may be associated with one or more servers that specifically provides hosting services through the cloud.

Server application may represent an application executing ("running") on server 130. The functionality of server application may be visible to and accessible by client 120 via application publishing over the cloud (e.g., communication network 110), such as that supported by GraphOn GO-Global, Microsoft Remote Desktop Services, and Citrix XenApp. Examples of server application 132 may include a computer-aided design (CAD) application, such as AutoCAD® (by Autodesk, Inc. of San Rafael, Calif.) or Cadence Virtuoso (by Cadence Design Systems of San Jose, Calif.), a medical clinical workflow application such as Symbia.net (by Siemens AG of Munich, Germany), an interactive mapping application such as Google Earth (by Google, Inc of Mountain View, Calif.), or a 3D game.

Figure 2:
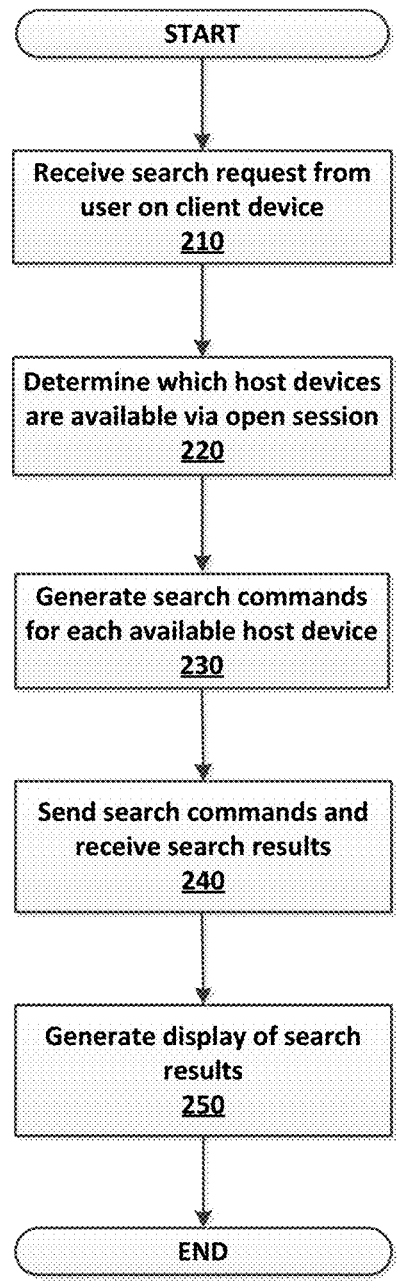
FIG. 2 is a flowchart illustrating an exemplary method for aggregated search.

FIG. 2 illustrates a method 200 for aggregated search. The method 200 of FIG. 2 may be embodied as executable instructions in a non-transitory computer readable storage medium including but not limited to a CD, DVD, or non-volatile memory such as a hard drive. The instructions of the storage medium may be executed by a processor (or processors) to cause various hardware components of a computing device hosting or otherwise accessing the storage medium to effectuate the method. The steps identified in FIG. 2 (and the order thereof) are exemplary and may include various alternatives, equivalents, or derivations thereof including but not limited to the order of execution of the same.

In method 200 of FIG. 2, a search request is received from a user using client device, it is determined which host devices are available via an open session with the client device, a search command is generates for each available host device, the search commands are sent to the respective host devices, search results from the respective host devices are received, and a display of the received search results is generated and displayed on the client device.

Figure 3:
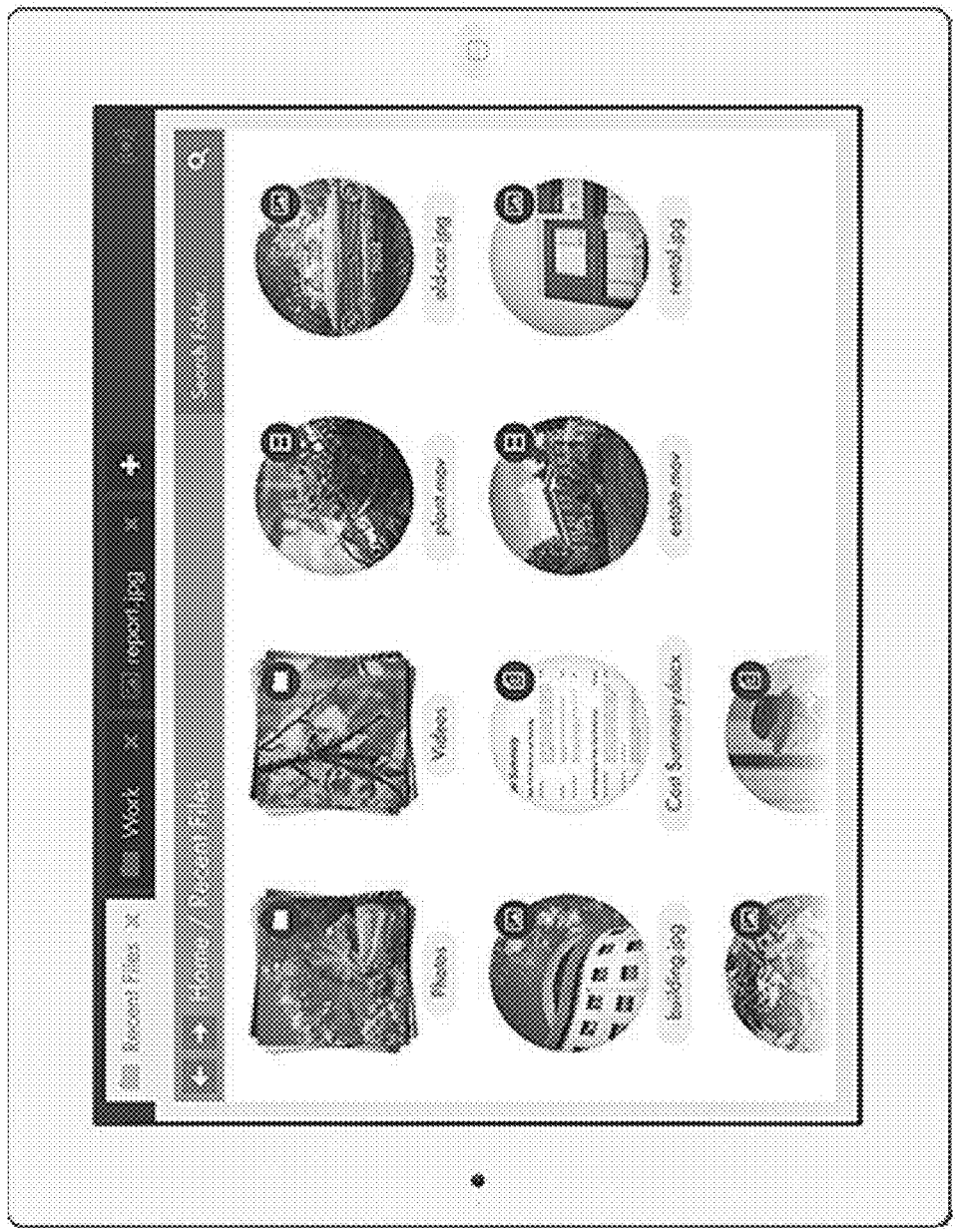
FIG. 3 is a screenshot of an exemplary client device having a window display that may be used in aggregated search.

In step 210, a search request is received from a client device (e.g., user device 120B). In some embodiments, the indication may be entered by the user onto the client device 120B via touchscreen, which may display one or more options for available hosts, folders, and/or documents. The user may enter or designate any variety of search parameters known in the art for searching files. For example, the user may enter full or partial file names, sizes, content within the file (e.g., full-text search), or any combination of the same. While the term "document" or document-specific terms may be used herein for convenience, the user may specify any kind of text, graphic, spreadsheet, slide, and other file known in the art that is capable of being accessed on a user device 120. Alternatively, the user may have saved a previous search or otherwise allowed for certain default search options. FIG. 3 is a screenshot of a display regarding "Recent Files," which may be considered a type of default search for files that were most recently accessed. FIG. 3 also illustrates a search box in the upper right-hand corner of the display where the user may further narrow the search or otherwise change the search parameters.

In step 220, it is determined which host devices are available to the client device via open sessions. In some embodiments, client device 120B may connect to any host device (e.g., user devices 120C-D) that are connected to the communication network 110 and that allow a session to be opened with client device 120B. In some cases, a session may be opened using a software application downloaded to the user devices 120A-D participating in the session. As a result of step 220, it may be determined that client device 120B has two host devices 120C-D, as well as a host service 140, available.

In step 230, a search command is generated for each host device (or service) identified in step 220. In some cases, generating a search command for a particular host device 120C (or host service 140) may involve use of a particular application programming interface (API), wrapper, or other search format known in the art. Referring the foregoing example, client device 120B may generate three search commands, one for host device 120C, one for host device 120D, and one for host service 140.

In step 240, the search commands are sent to the respective host devices, and search results are received in response. As noted above with respect to step 210, the search request may include any combination of search parameters known in the art for finding a file. In that regard, once the search command is received at a host device 120C, the host device 120C may execute the search command to retrieve information regarding files matching the search parameters specified by the search command. No file, one file, or multiple files may be found be meet the search parameters. That information may be sent from host device 120C to client device 120B.

In step 250, a display is generated on client device 120B regarding the collective search results received from the host devices 120C-D and/or host service 140. Referring to FIG. 3, such a display may appear as a set of icons. Alternative displays may include thumbnails, tiles, lists, and any additional details associated with the files indicated by the search results. For example, a display may indicate which host device is currently hosting each file. The display may also sort the search results based on any detail associated with the files (e.g., by host device). From the display, a user of the client device 120B may be able to select and access such files.

Such access to a file may further include accessing a particular application associated with the same. Being associated with an application means that the document may be accessed, viewed, or the contents otherwise manipulated using the application. The document may be any kind of document known in the art and associated with any application known in the art. User selection of the file is further not necessarily limited by the particular applications that are available on the client device 120B or the particular host device 120C that hosts the file.

Where the session to host device 120C is already open and includes access to other files, selection of the file may involve initiating a new application instance. The client device 120B (or application on client device 120B) may also update the number of instances or number of files from host device 120C are viewed/displayed on client device 120B. In that regard, when the user closes all files from a host device 120B, the remote session with host device 120C may be closed as well.

Moreover, depending on the particular file (e.g., type, size, file extension), the file may be downloaded to client device 120B or viewed remotely on client device 120B. Various algorithms may be used to evaluate each file to determine which may be the fastest way to access the requested file in light of the particular file, application, client device, network connectivity, and other status information known in the art. In addition, user preferences may also be considered in determining whether to download to or enable remote viewing.

There may also be instances where the host device 120C may not host the application associated with the selected file. In that regard, the client device 120B may determine whether it (client device 120B) or another host device 120D may host an application that may be used to open, view, or manipulate the first document. Wherever a file or application is located, the user is provided with the ability to direct and combine such remote resources so as to be able to open, view, and other manipulate the file within the window display of the client device 120B.

In a remote access system, such as client-server computing system 100, the "remoting" software may be installed and executing (i.e., "running") on a host device (e.g., host device 120C). Such software may allow users to remotely access applications that are installed on host device 120C. By way of example, a set of applications may be installed on host device 120C. Such applications represent any applications, programs, and/or processes executing (i.e., "running") on host device 120C. The functionality of the applications shall be visible to and accessible by client devices (e.g., client device 120B) via communication network 110 using a process herein known as application publishing, which is currently supported by such products as GraphOn GO-Global, Microsoft Remote Desktop Services, and Citrix XenApp. Such application publishing may be also performed in accordance with teachings of commonly-owned U.S. Pat. No. 5,831,609 filed Jun. 6, 1995 and entitled "Method and system for dynamic translation between different graphical user interface systems" which is incorporated by reference as though fully set forth herein. Such functionalities are also described in further detail in co-pending U.S. patent application Ser. No. 13/481,743, the disclosure of which is incorporated herein by reference. Where there are multiple possible application that can be used to open the first document, the user may designate a preferred application for the document type, or the user may be provided with a menu of the possible applications for selection.

Selection of a file may also initiate a tab display in a window of client device 120B. The client device 120B may generate an image display that corresponds to a tabbed display such as appears in the screenshot of FIG. 3. As illustrated, the screenshot includes a tab bar near the top of the display. Underneath the tab bar is a display view associated with the currently selected tab. Such views may include views of any document, file, folder, bookmarks, or other type of content known in the art as capable of being displayed in a tab view. A user may switch between views (e.g., of different documents) by selecting the associated tab, which may remain visible or which may be summoned at any time within the window display of the client device 120B. In FIG. 3, there is a tab titled "Recent Files," a tab titled "Work," and a tab titled "report.jpg." The current view in the window display is that associated with "Recent Files," but if the user selects "report.jpg.," the window display would switch to the view associated with "report.jpg." Likewise, while viewing "report.jpg," the user may select another tab, which switches to a corresponding view. Such ability to switch views efficiently allows for in-app multi-tasking within the display window of a remote client device 120B where multiple remotely-hosted documents to be openable, viewable, and manipulable from within one window/application.

The user may select another document of interest. The second document may be the same or a different application from that of the first document. In addition, the second document may be hosted by a different remote host. The window display of the client device 120B may include a view of the second requested document, along with one or more other tabs including the tab associated with the first requested document. The user may select any other tab to switch views to a different document (or folder). As illustrated in FIG. 3, there may be a tab that allows for the addition for more tabs. Moreover, each tab may be associated with an option for closing the document associated with the same. When a document is closed, such closure may be tracked so as to allow for determining whether a session with a particular host should be closed as well. The user may also choose to save any edits, as well as designate whether and where the edited document should be saved.

Various embodiments of the present invention allow for the method 200 to be performed by an intermediary device (e.g., server 130) which may be associated with the host device or reside elsewhere in the network (e.g., in the cloud). For example, server 130 may receive the request from a requesting client device 120B, forward to a host client devices 120C-D (and/or host service 140), receive responsive data from host client devices 120C-D, use the responsive data to generate the display instructions for client device 120B display, which may then be sent to client device 120B.

Alternatively, the method 200 may be performed by software (e.g., an application) downloaded to a user device 120B. For example, software located at requesting client device 120B may receive the user requests, forward the requests to host devices/services 120C-D/140, receive responsive data responsive to the request as provided by host client device 120C, use the responsive display data to generate the instructions for client device 120B display, which may then be sent or otherwise provided to client device 120B for execution.

The present invention may be implemented in an application that may be operable using a variety of devices. Non-transitory computer-readable storage media refer to any medium or media that participate in providing instructions to a central processing unit (CPU) for execution. Such media can take many forms, including, but not limited to, non-volatile and volatile media such as optical or magnetic disks and dynamic memory, respectively. Common forms of non-transitory computer-readable media include, for example, a floppy disk, a flexible disk, a hard disk, magnetic tape, any other magnetic medium, a CD-ROM disk, digital video disk (DVD), any other optical medium, RAM, PROM, EPROM, a FLASHEPROM, and any other memory chip or cartridge.

Various forms of transmission media may be involved in carrying one or more sequences of one or more instructions to a CPU for execution. A bus carries the data to system RAM, from which a CPU retrieves and executes the instructions. The instructions received by system RAM can optionally be stored on a fixed disk either before or after execution by a CPU. Various forms of storage may likewise be implemented as well as the necessary network interfaces and network topologies to implement the same.

While various embodiments have been described above, it should be understood that they have been presented by way of example only, and not limitation. The descriptions are not intended to limit the scope of the invention to the particular forms set forth herein. Thus, the breadth and scope of a preferred embodiment should not be limited by any of the above-described exemplary embodiments. It should be understood that the above description is illustrative and not restrictive. To the contrary, the present descriptions are intended to cover such alternatives, modifications, and equivalents as may be included within the spirit and scope of the invention as defined by the appended claims and otherwise appreciated by one of ordinary skill in the art. The scope of the invention should, therefore, be determined not with reference to the above description, but instead should be determined with reference to the appended claims along with their full scope of equivalents.

What is claimed is:

1. A system for providing aggregated search, the system comprising:
   a client device that:
      receives a search request from a user on a client device, wherein the received search request relates to a user request for a remote file;
      determines that a plurality of remote host devices are available, wherein availability of the plurality of remote host devices corresponds to currently open remote sessions between the client device and the plurality of remote host devices, and
      generates a plurality of search commands for the available remote host devices related to the user request for the remote file, wherein at least one generated search command is based on an application programming interface specific to one of the available remote host devices,
      sends the generated search commands for the available remote host devices with which the client device currently has open sessions, wherein each available remote host device:
         hosts a plurality of files,
         receives the generated search command sent from the client device,
         executes the generated search command to retrieve information regarding any files that meet parameters of the search request, and
         sends information regarding any retrieved files to the client device,
      wherein the client device receives the information sent by the plurality of available remote host devices and generates a display of search results based on the information received from one or more of the remote host devices related to the user request for the remote file, wherein the display indicates which of the remote host devices are currently hosting the user requested remote file and which of the remote host devices are capable of accessing the user requested remote file, and wherein the display further has an option to use an application hosted at one of the remote host devices to access the remote file that is hosted at another of the remote host devices.

2. The system of claim 1, wherein the remote host devices includes a host server that provides hosting services through a cloud.

3. The system of claim 1, wherein the search request includes at least a partial file name.

4. The system of claim 1, wherein the search request includes a file size.

5. The system of claim 1, wherein the search request is from a previous search.

6. The system of claim 1, wherein the search request is associated with one or more default search options.

7. The system of claim 1, wherein the client device receives a selection from a user of the client device, the selection indicating one of the search results, and generates a new tab display of the selection in a display screen of the client device.

8. The system of claim 7, wherein the tab display is generated using an application hosted on another remote host device than the remote host device that hosts the selection.

9. The system of claim 7, wherein the display screen of the client device includes a tab bar comprising a plurality of tabs, each tab associated with a file hosted by different remote host devices.

10. A method for providing aggregated search, the method comprising:
receiving a search request from a user on a client device, wherein the received search request relates to a user request for a remote file;
executing instructions stored in memory, wherein execution of the instructions by a processor:
determines that a plurality of remote host devices are available, wherein availability of the plurality of remote host devices corresponds to currently open remote sessions between the client device and the plurality of remote host devices, and
generates a plurality of search commands for the available remote host devices related to the user request for the remote file, wherein at least one generated search command is based on an application programming interface specific to one of the available remote host devices;
sending the generated search commands for the available remote host devices with which the client device currently has open sessions, wherein each available remote host device:
hosts a plurality of files,
receives the generated search command sent from the client device,
executes the generated search command to retrieve information regarding any files that meet parameters of the search request, and
sends information regarding any retrieved files to the client device;
receiving the information sent by the plurality of available remote host devices; and
generating a display of search results based on the information received from one or more of the remote host devices related to the user request for the remote file, wherein the display indicates which of the remote host devices are currently hosting the user requested remote file and which of the remote host devices are capable of accessing the user requested remote file, and wherein the display further has an option to use an application hosted at one of the remote host devices to access the remote file that is hosted at another of the remote host devices.

11. The method of claim 10, wherein the remote host devices includes a host server that provides hosting services through a cloud.

12. The method of claim 10, wherein the search request includes at least a partial file name.

13. The method of claim 10, wherein the search request includes a file size.

14. The method of claim 10, wherein the search request is from a previous search.

15. The method of claim 10, wherein the search request is associated with one or more default search options.

16. The method of claim 10, further comprising receiving a selection from a user of the client device, the selection indicating one of the search results, and generating a new tab display of the selection in a display screen of the client device.

17. The method of claim 16, wherein the tab display is generated using an application hosted on another remote host device than the remote host device that hosts the selection.

18. The method of claim 16, wherein the display screen of the client device includes a tab bar comprising a plurality of tabs, each tab associated with a file hosted by different remote host devices.

19. A non-transitory computer-readable storage medium, having embodied thereon a program executable by a processor to perform a method for providing aggregated search, the method comprising:
receiving a search request from a user on a client device, wherein the received search request relates to a user request for a remote file;
determining that a plurality of remote host devices are available, wherein availability of the plurality of remote host devices corresponds to currently open remote sessions between the client device and the plurality of remote host devices;
generating a plurality of search commands for the available remote host devices related to the user request for the remote file, wherein at least one generated search command is based on an application programming interface specific to one of the available remote host devices;
sending the generated search commands for the available remote host devices with which the client device currently has open sessions, wherein each available remote host device:
hosts a plurality of files,
receives the generated search command sent from the client device,
executes the generated search command to retrieve information regarding any files that meet parameters of the search request, and
sends information regarding any retrieved files to the client device;
receiving the information sent by the plurality of available remote host devices; and
generating a display of search results based on the information received from one or more of the remote host devices related to the user request for the remote file, wherein the display indicates which of the remote host devices are currently hosting the user requested remote file and which of the remote host devices are capable of accessing the user requested remote file, and wherein the display further has an option to use an application hosted at one of the remote host devices to access the remote file that is hosted at another of the remote host devices.

\* \* \* \* \*